Jan. 16, 1934.  W. HEIGH  1,944,128

METALLIC EXPANSION JOINT

Original Filed March 26, 1931

INVENTOR
*William Heigh*
BY
HIS ATTORNEY

Patented Jan. 16, 1934

1,944,128

UNITED STATES PATENT OFFICE 1,944,128

METALLIC EXPANSION JOINT

William Heigh, Cambuslang, Scotland, assignor to The Babcock & Wilcox Company, Bayonne, N. J., a corporation of New Jersey Application March 26, 1931, Serial No. 525,440, and in Great Britain May 9, 1930. Renewed May 17, 1933

8 Claims. (Cl. 285—90)

This invention relates to metallic expansion joints, and more particularly to expansion joints for joining air and gas ducts which will insure, without packing, a permanently gas tight seal and permit expansion and contraction of associated parts.

An object of the invention is to provide expansion joints for joining air and gas ducts which will form a gas tight seal therewith, while permitting expansion and contraction of the ducts.

A specific object of the invention is to provide an expansion joint of substantially rectangular cross-section built up of side and end plates, each formed with a series of substantially V-shaped corrugations, with corner plates connecting each side and end plate, the corner pieces being folded to form corrugated limbs extending at right angles, with the corrugations on one limb lying within the corrugations on the other, so that the peak of the corrugation on one limb lies within the depression in the corrugation on the other limb.

Other objects will be apparent to those skilled in this particular art from the description in the specification in connection with the appended drawing, in which—

Figure 1:
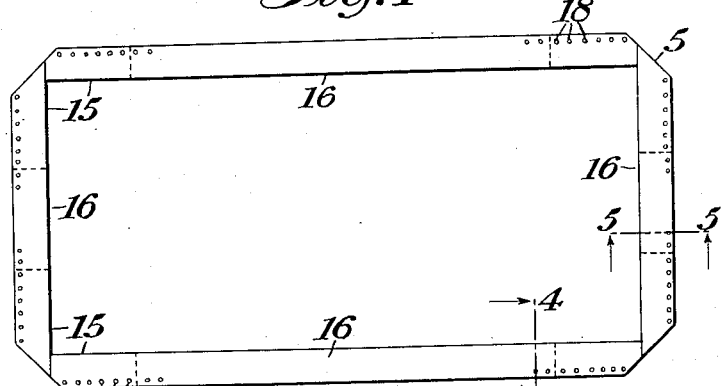
Fig. 1 is a plan view of an expansion joint illustrative of the invention.
Figure 2:
Fig. 2 is a front elevation of Fig. 1.
Figure 3:
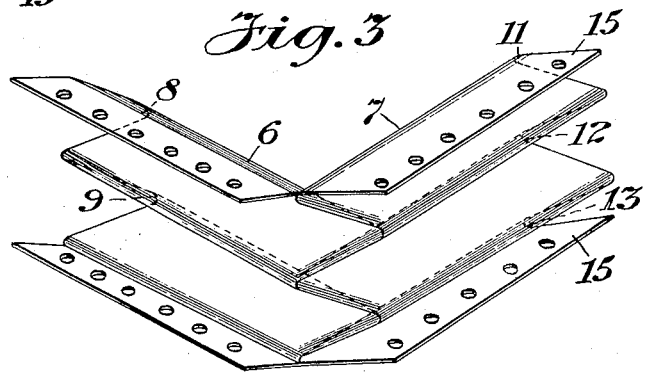
Fig. 3 is a perspective view of a detail of the invention.
Figure 4:
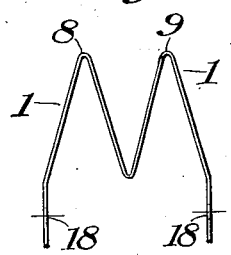
Fig. 4 is a section taken along the line 4—4 of Fig. 1.
Figure 5:
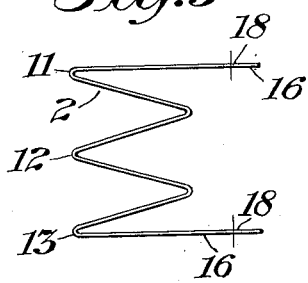
Fig. 5 is a section taken along the line 5—5 of Fig. 1.

In that embodiment of the invention which has been chosen for purposes of illustration, there is shown in the drawing an expansion joint having corrugated sides 1 and ends 2 with reverse corrugations between the ends and sides, as best shown in Figs. 4 and 5. Joining the side and end plates are corner pieces 5, made up of a pair of limbs 6 and 7 with substantially V-shaped corrugations. The limb 6, as shown, presents two projecting points 8 and 9, and the limb 7 presents three projecting points 11, 12 and 13, so that one limb lies within the other at right angles and provides a compressible corner piece. Flanges 15 at the same level with each other abut similar flanges 16 on the side and end plates.

The corner pieces are secured to the side and end plates by welding, as indicated at the points 17, and form a gas tight joint therewith, the corrugations of the limbs of the corner pieces coinciding in contour with the corrugations in the side and end plates to which they are welded.

The flanges 15 and 16 are also welded together and form a continuous member. Rivet holes 18 are provided in the flanges so that they serve as convenient mounting members to be secured to the faces of the ducts to be joined by the expansion joint embodying this invention.

Each junction of the several parts making up this expansion joint is made gas tight, preferably by welding, so that a substantially permanent gas tight structure is provided that is deformable within a relatively wide range of limits for devices of this character.

Although a specific embodiment of the invention has been described, it is understood that changes, substitutions, additions and omissions may be made therein within the spirit of the invention as defined by the appended claims.

What I claim is:

1. An expansion joint including a side plate and an end plate, each formed with a series of corrugations, and a corrugated corner piece connecting the side and end plates, said corner piece being shaped to form limbs extending so that one limb lies within a corrugation on the other limb.

2. In an expansion joint having corrugated side and end plates with the corrugations of adjacent plates opposite in character, corner pieces including two corrugated limbs joining the side and end plates, the corrugations of the limbs being arranged so as to coincide with the side and end plates to which they are joined, and the peak of each corrugation on one limb falling within the depression of the corrugation on the other limb.

3. A metallic expansion joint including side and end plates formed with oppositely disposed corrugations, and corner pieces disposed between the side and end plates having corrugated limbs coinciding with the corrugations of the side and end plates and welded thereto, to form a gas tight joint.

4. A metallic expansion joint of substantially rectangular cross-section, including side and end plates each formed with substantially V-shaped corrugations, and corner pieces connecting each side and end plate provided with limbs similar in shape to adjacent side and end plates and secured thereto, the corrugations on one limb lying within the corrugations on the other so that the peak of the corrugation on one limb lies within the depression of the corrugation on the other limb.

5. An expansion joint for metallic ducts including side and end portions, each formed with a series of corrugations, the corrugations being so arranged that the peak of each corrugation of the side portions falls within the depression of each corrugation of the end portions.

6. An expansion joint including a metallic corner member having plate sections arranged at an angle to one another and each formed with substantially V-shaped corrugations, said plate sections being arranged with a corrugation on one of said plate sections lying within a corrugation on the other plate section.

7. An expansion joint comprising a corner member shaped to form two integrally connected metallic plate sections arranged at an angle to one another and each having one or more substantially V-shaped corrugations formed therein, said plate sections being arranged with a ridge at one side of one plate section forming a continuation of a ridge at the opposite side of the other plate section.

8. An expansion joint comprising a sheet metal member folded to form two metallic plate sections arranged at substantially right angles to one another and each having one or more substantially V-shaped corrugations formed therein, said plate sections being arranged with a ridge at one side of one plate section forming a continuation of a ridge at the opposite side of the other plate section, and with the ridge in the first plate section lying partly within a furrow at the same side of the other plate section and with flange members integrally formed in said plate sections at opposite sides of the corrugations therein.

WILLIAM HEIGH.